United States Patent
Saito et al.

(10) Patent No.: US 12,158,747 B2
(45) Date of Patent: Dec. 3, 2024

(54) METHOD OF ARRANGING EQUIPMENT IN PLANT AND METHOD OF MANUFACTURING PLANT

(71) Applicant: JGC CORPORATION, Kanagawa (JP)

(72) Inventors: Toshiaki Saito, Kanagawa (JP); Yoshinori Hiroya, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 0 days.

(21) Appl. No.: 17/626,487

(22) PCT Filed: Sep. 2, 2019

(86) PCT No.: PCT/JP2019/034490
§ 371 (c)(1),
(2) Date: Jan. 11, 2022

(87) PCT Pub. No.: WO2021/044501
PCT Pub. Date: Mar. 11, 2021

(65) Prior Publication Data
US 2022/0283569 A1   Sep. 8, 2022

(51) Int. Cl.
*G05B 19/418*   (2006.01)
(52) U.S. Cl.
CPC ..... *G05B 19/4184* (2013.01); *G05B 19/4183* (2013.01); *G05B 19/41885* (2013.01)
(58) Field of Classification Search
CPC ............ G05B 19/4184; G05B 19/4183; G05B 19/41885; A62C 3/00; A62C 35/00; A62C 99/009; A62B 99/00; G06N 5/04
(Continued)

(56) References Cited

U.S. PATENT DOCUMENTS 10,948,471 B1 * 3/2021 MacMullin ........ G01N 33/0047
2006/0129338 A1 * 6/2006 Turley ..................... F17D 5/00
702/51
(Continued)

FOREIGN PATENT DOCUMENTS

CN         2168290 Y  *  6/1994
JP         H03126173      5/1991
(Continued)

OTHER PUBLICATIONS

The health and safety consultancy, "What is a Risk Rating—How Do I Do a Risk Assessment?", http://www.thehealthandsafetyconsultancy.co.uk/guides/riskrating.asp, The Wayback Machine—https://web.archive.org/web/20130708135026/http://www.thehealthandsafetyconsultancy.co.uk:80/guides/riskrating.asp (Year: 2013).*
(Continued)

*Primary Examiner* — Thomas C Lee
*Assistant Examiner* — Michael Tang
(74) *Attorney, Agent, or Firm* — JCIPRNET (57) ABSTRACT

Provided is a technology for efficiently arranging equipment. A method of arranging equipment in a plant for processing a fluid includes: calculating a risk; obtained by multiplying a probability that flowing-out of a fluid requiring use of the equipment occurs by an impact degree of the flowing-out of the fluid; setting a distance of a range in which the equipment is arrangeable so that, when the calculated risks of a plurality of devices are compared with each other, the range in which the equipment is arrangeable is shorter for a device for which the risk is high, and the range is longer for a device for which the risk is low; and then determining a position to arrange the equipment based on positions at which the plurality of devices are arranged in (Continued)

the plant, and on the distance of the range in which the equipment is arrangeable.

5 Claims, 9 Drawing Sheets

(58) Field of Classification Search
USPC .......................................................... 700/108
See application file for complete search history.

(56) References Cited

U.S. PATENT DOCUMENTS

| | | | | |
|---|---|---|---|---|
| 2009/0000097 | A1* | 1/2009 | Dapkins, Jr. ........... | A62B 3/005 173/90 |
| 2009/0218108 | A1* | 9/2009 | Cano ...................... | A62C 27/00 169/24 |
| 2013/0262068 | A1* | 10/2013 | Israeli ...................... | F17D 5/02 703/9 |
| 2021/0322806 | A1* | 10/2021 | Fernandez-Orellana .................... | G08B 17/10 |
| 2021/0350312 | A1* | 11/2021 | Swift ............... | G06Q 10/06313 |

FOREIGN PATENT DOCUMENTS

| | | |
|---|---|---|
| JP | H08110916 A * | 4/1996 |
| JP | H11353354 | 12/1999 |
| JP | 2000231584 | 8/2000 |
| JP | 2011180855 | 9/2011 |
| KR | 100587819 B1 * | 6/2006 |

OTHER PUBLICATIONS

Yuri Raydugin, "Consistent Application of Risk Management for Selection of Engineering Design Options in Mega-Projects", International Journal of Risk and Contingency Management, 1(4), 44-55, Oct.-Dec. 2012 (Year: 2014).*

NFPA chapter 10 "Standard for Portable Fire Extinguishers" 2018 (Year: 2018).*

Saunders, "Quantifying Fire Hazards" 2018, MS thesis in Fire Protection and Administration, The University of North Carolina at Charlotte, 2018 (Year: 2018).*

"International Search Report (Form PCT/ISA/210) of PCT/JP2019/034490," mailed on Nov. 12, 2019, with English translation thereof, pp. 1-4.

* cited by examiner

METHOD OF ARRANGING EQUIPMENT IN PLANT AND METHOD OF MANUFACTURING PLANT

CROSS-REFERENCE TO RELATED APPLICATION

This application is a 371 of international application of PCT application serial no. PCT/JP2019/034490, filed on Sep. 2, 2019. The entirety of the above-mentioned patent application is hereby incorporated by reference herein and made a part of this specification.

TECHNICAL FIELD

The present invention relates to a technology for arranging equipment, which is safety protective equipment and a safety monitoring apparatus, in a plant for processing a fluid.

BACKGROUND ART

Plants for processing fluids include, for example, a natural gas plant for liquifying natural gas, and separating and recovering natural gas liquid, an oil refinery plant for distilling and desulfurizing crude oil and various intermediate products, a chemical plant for producing petrochemicals, intermediate chemicals, and polymers, a pharmaceutical plant for producing pharmaceuticals and intermediate products thereof, and a waste treatment plant for treating low-level radioactive wastes.

The term "fluid" as used herein includes, in addition to gas and liquid, powder and granular materials (such as powders, granules, and pellets) having fluidity.

When a failure or breakage occurs in a device provided in those plants, a fluid inside the device leaks, and incidents depending on properties of the fluid, such as a fire, contamination with a toxic substance, and a reduction in oxygen concentration, may occur. Therefore, even when those incidents occur, in order to ensure safety of an operator located near the position at which the leakage occurs, and to suppress an increase of damage, safety protective equipment such as fire extinguishers, self-contained breathing apparatus, and gas masks are arranged in the plant. Further, in order to notify nearby personnel of the occurrence of the leakage of the fluid and the incidents accompanying the leakage as soon as possible, safety monitoring apparatus such as an information apparatus (such as emergency button or emergency telephone station) and a monitoring camera are also arranged in the plant. Those safety protective equipment and safety monitoring apparatus are hereinafter also collectively referred to as "equipment".

For example, fire extinguishers may be arranged based on fire laws of various countries and standards developed by industry associations (for example, US National Fire Protection Association (NFPA)) (for example, Patent Literature 1). However, those laws and standards are often established assuming general buildings, such as an office building.

Meanwhile, the plants for processing a fluid are often built outdoors. Further, there are many areas in which no operator is stationed full time except for when an inspection or temporary operation is conducted, and application of a standard for general buildings may not be suited for the situation in some cases.

However, clear standards common to countries may not be established for arrangement of fire extinguishers in a plant, and for detailed arrangement that cannot be determined exactly by the law in the country in which the plant is built, for example, there have been cases in which there is no option but to employ the standard of the NFPA.

As a result, there may be chosen such irrational arrangement as to arrange many fire extinguishers at regular intervals even in an area in which incidents such as a fire and contamination are unlikely to occur because fluids are rarely handled in the area.

Further, there are a variety of equipment arranged in a plant, and there may exist no arrangement standard for equipment other than fire extinguishers.

CITATION LIST

Patent Literature

[PTL 1] JP 11-353354 A

SUMMARY OF INVENTION

Problem to be Solved

The present invention is to provide a technology for efficiently arranging equipment, which is safety protective equipment and a safety monitoring apparatus, in a plant.

Solution to Solve the Problem

According to one embodiment of the present invention, there is provided a method of arranging equipment in a plant, the equipment being safety protective equipment and/or a safety monitoring apparatus to be used in fire extinguishing operation by an operator, or to be used for safety protection of an operator in a plant for processing a fluid, the method including the steps of: calculating a risk for each of a plurality of devices provided in the plant, the risk being a value obtained by multiplying a probability that flowing-out of a fluid requiring use of the equipment occurs by an impact degree of the flowing-out of the fluid; setting a distance indicating a range in which the equipment is arrangeable around the each of the plurality of devices so that, when the calculated risks of the plurality of devices are compared with each other, the distance is shorter for a device for which the risk is relatively high, and the distance is longer for a device for which the risk is relatively low; and determining a position to arrange the equipment based on positions at which the plurality of devices are arranged in the plant, and on the distance of the range in which the equipment is arrangeable, which has been set for each of the plurality of devices.

The method of arranging equipment in a plant may have the following features.
  (a) The equipment is one selected from an equipment group consisting of a fire extinguisher, a self-contained breathing apparatus, a gas mask, a stretcher, a fire blanket, an emergency information apparatus, and a monitoring camera.
  (b) The step of setting the distance of the range in which the equipment is arrangeable includes categorizing the risks calculated for the plurality of devices into classes that have been set in advance depending on levels of the risks to set the distance so that the distance is shorter for a device categorized into a class of relatively high risk, and the distance is longer for a device categorized into a class of relatively low risk.
  (c) A minimum number of arranged pieces of the equipment per unit area in a region in which a plurality of devices are arranged in the plant is set to arrange the equipment so as to satisfy the minimum number of arranged pieces in a region in which the plurality of devices are arranged, and for which the number of pieces of the equipment per unit area arranged at positions that have been determined in the step of determining the position to arrange the equipment is less than the minimum number of arranged pieces.

(d) A maximum number of pieces of the equipment per unit area in a region in which a plurality of devices are arranged in the plant is set to arrange the equipment so as to satisfy the maximum number of pieces in a region in which the plurality of devices are arranged, and for which the number of pieces of the equipment per unit area arranged at positions that have been determined in the step of determining the position to arrange the equipment exceeds the maximum number of pieces.

In addition, a method of manufacturing a plant according to one embodiment of the present invention includes a step of arranging, at the position to arrange the equipment that has been determined in the above-mentioned step of determining the position to arrange the equipment in the plant, a portion to arrange the equipment.

Effects of Invention

With the method of arranging equipment in a plant according to the present invention, the severity of the risk accompanying the flowing of the fluid out of the device provided in the plant is determined, and the distance of the range in which the equipment is arrangeable from the device is adjusted depending on the severity of the risk so that the equipment can be arranged rationally in the plant.

DESCRIPTION OF EMBODIMENTS

Now, an embodiment of the present disclosure in which a method of arranging equipment in a plant according to the present disclosure is applied to an LNG plant is described.

Figure 1:
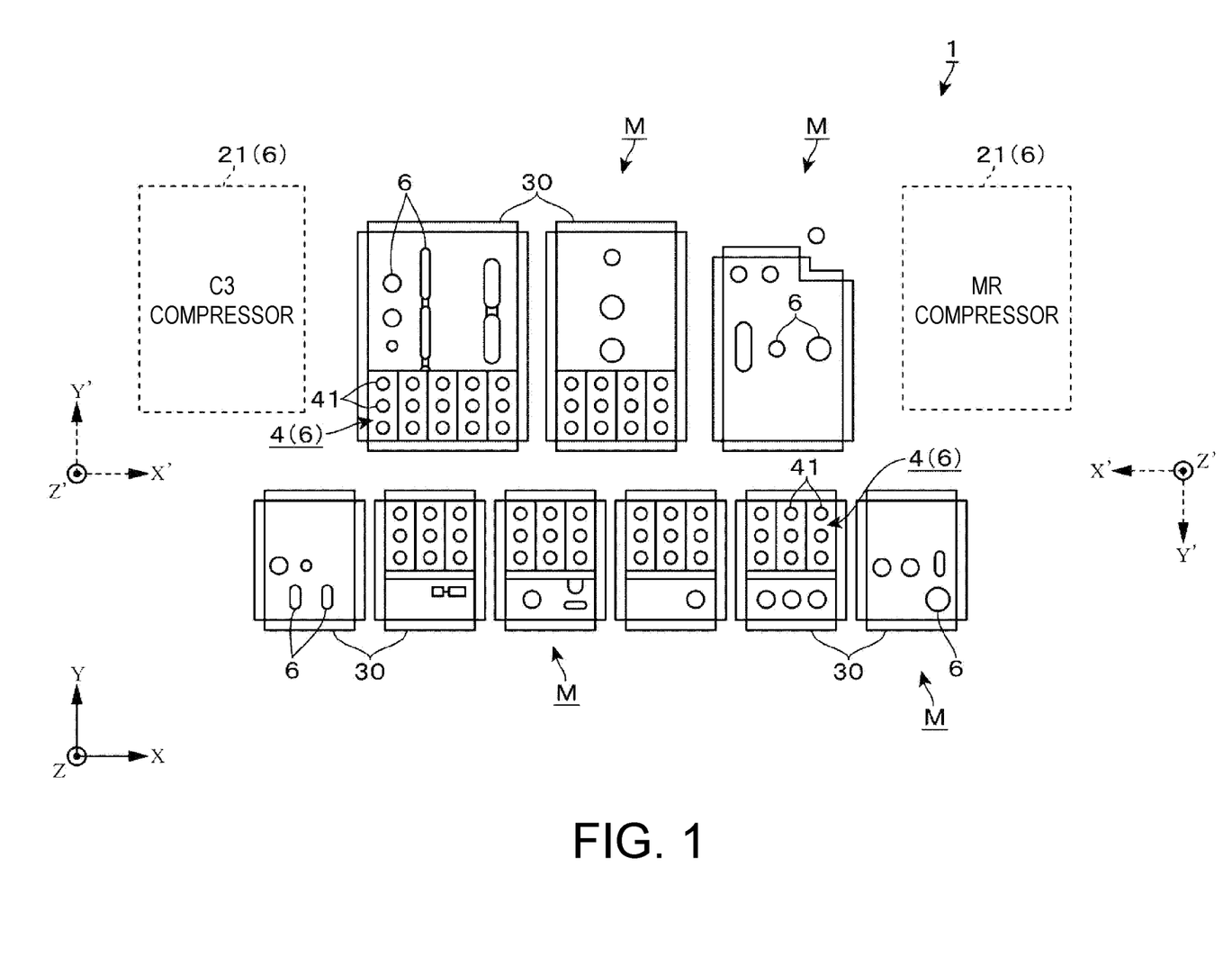
FIG. 1 is a plan view for illustrating an example of a layout of an LNG plant, to which a method of arranging equipment according to an embodiment of the present invention is applied.

FIG. 1 shows a schematic plot of an LNG plant 1. In the LNG plant 1, natural gas (NG), which is gas from which contaminants are removed by preprocessing, is precooled, is separated into gas and liquid, and is then further cooled to liquify and supercool the NG, to thereby obtain LNG, which is liquid. Further, liquid obtained by separating the NG into gas and liquid is rectified, and while light components separated during the rectification merge with a flow of NG to be liquified, heavy components are further distilled and separated to be shipped or used as liquefied petroleum gas (LPG) or condensate in the LNG plant 1.

In order to execute various kinds of processing briefly described above, in the LNG plant 1, there are provided a large number of devices 6 configured to treat a fluid, such as a processing tower 61 and a vessel 62, which are used to, for example, separate various contaminants from, distill, and separate into gas and liquid the NG, a heat exchanger 63 configured to heat or cool a fluid, pumps 64 used to transport liquid, and pipes 42 through which various fluids flow.

There are also provided devices 6, such as refrigerant compressors 21 configured to compress a precooling refrigerant for precooling the NG or a liquifying refrigerant for liquifying and supercooling the NG, and air cooled heat exchangers (ACHEs) 41 configured to cool the compressed refrigerant.

In the LNG plant 1, there may further be provided devices 6, such as a gas turbine or steam turbine configured to drive a generator, and a boiler configured to supply steam or hot water.

In the LNG plant 1 in this example, the large number of above-mentioned devices 6 are classified into a plurality of groups depending on, for example, details of processing of the NG or the refrigerant, or functions of supplying power or steam. Then, the large number of grouped devices 6 (device groups) are collectively arranged in a structure 30 having a multi-floor structure. A structure in which the large number of devices 6 are arranged in the structure 30 is hereinafter referred to as a "module M".

As illustrated in FIG. 1, the LNG plant 1 in this example includes a row of a plurality of modules M arrayed in a side-by-side direction, and has a configuration in which two rows of the modules M are arranged in parallel. Further, on sides of one row of the modules M, the refrigerant compressors 21, which are an MR compressor and a C3 compressor, are arranged.

As described above, through separating the LNG plant 1 into the plurality of modules M, the LNG plant 1 can be formed by constructing the modules M at a place different from a construction site of the LNG plant 1, transporting and installing the modules M to the construction site, and then connecting the plurality of modules M.

Coordinate axes illustrated with the solid lines of FIG. 1 indicate directions of the entire LNG plant. Further, auxiliary coordinate axes illustrated with the broken lines of FIG. 1, FIG. 2, and FIG. 5 to FIG. 9 indicate directions focusing on the modules M, and an origin side of a Y' axis of the auxiliary coordinate axes is referred to as a "trailing end side", and an arrow direction side is referred to as a "leading end side".

Next, a specific configuration example of a module M is described with reference to FIG. 2. The module M illustrated in FIG. 2 includes a plurality of ACHEs 41 provided on an upper surface side of the structure 30. The LNG plant 1 in this example also includes modules M including no ACHE 41, but the modules M have common components in the following description otherwise.

Figure 2:
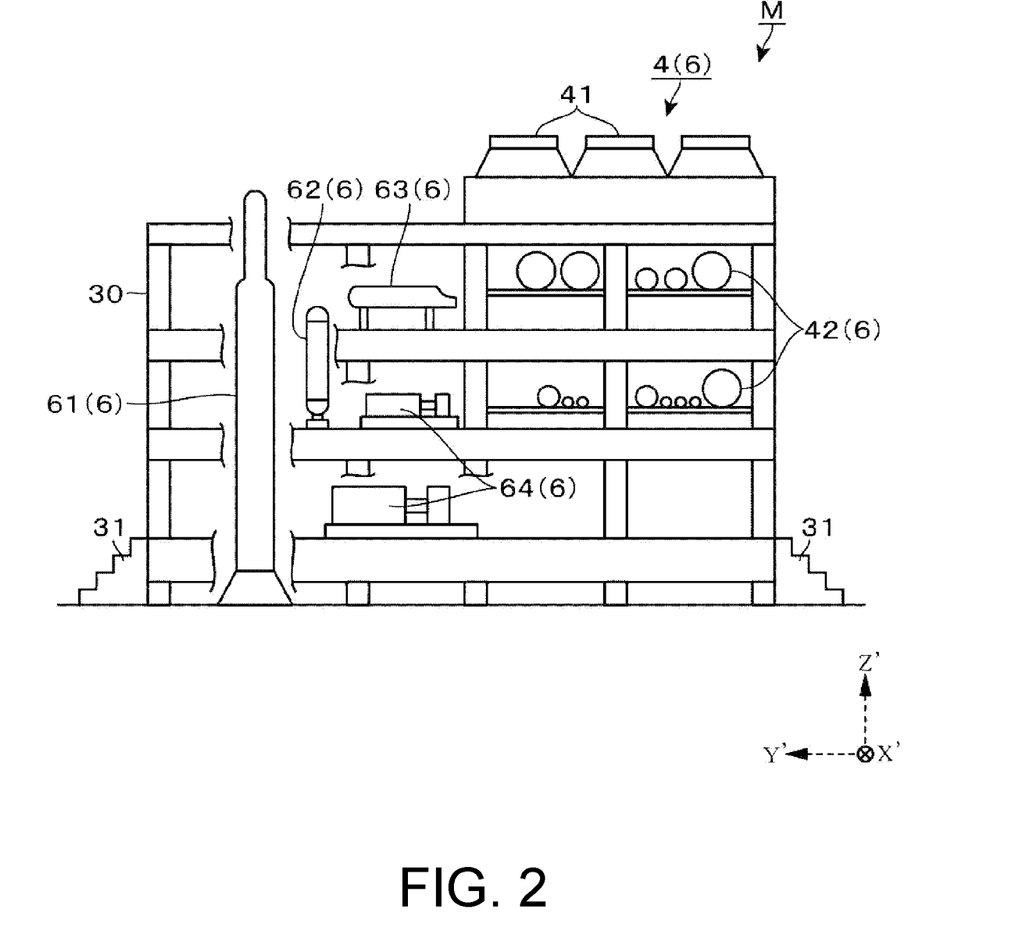
FIG. 2 is a side view of a module to form the LNG plant.

As illustrated in FIG. 1 and FIG. 2, the structure 30 forming each module M is a steel skeleton structure having the multi-floor structure, which is formed into a substantially rectangular shape in plan view, and in which the large number of devices 6 can be arranged in multiple layers in a vertical direction.

Figure 5:
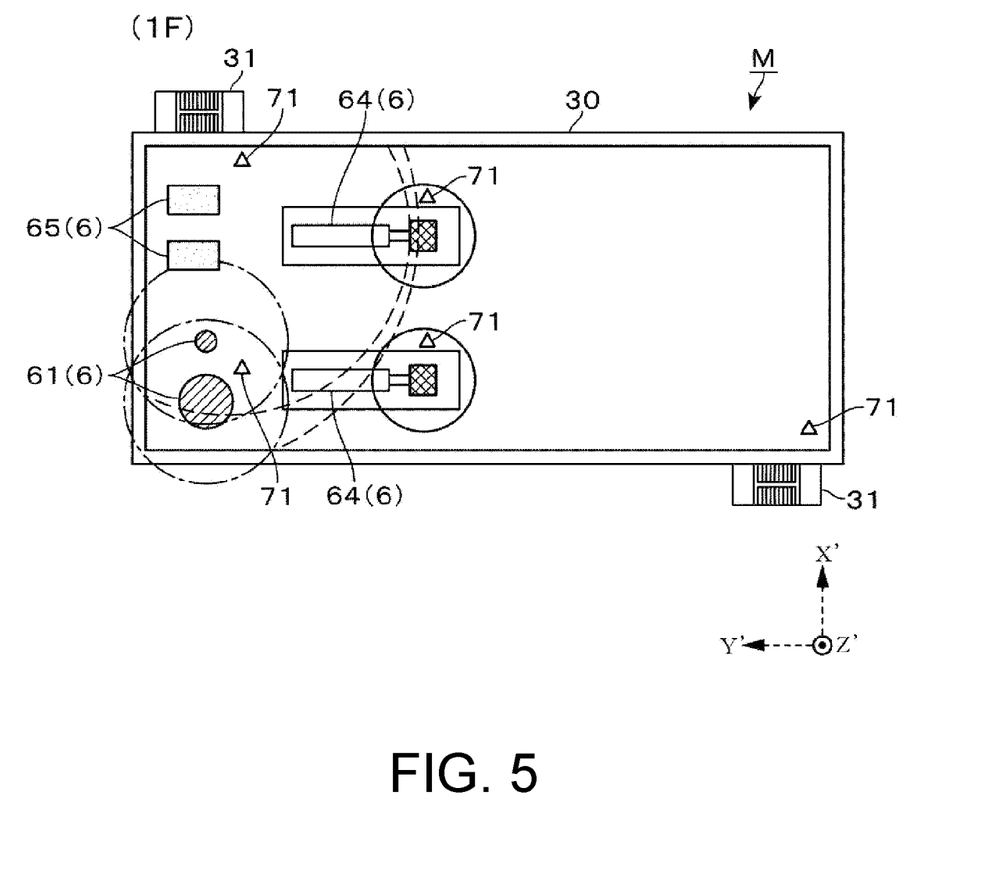
FIG. 5 is a first explanatory diagram for illustrating an example of arranging fire extinguishers in the module.
Figure 6:
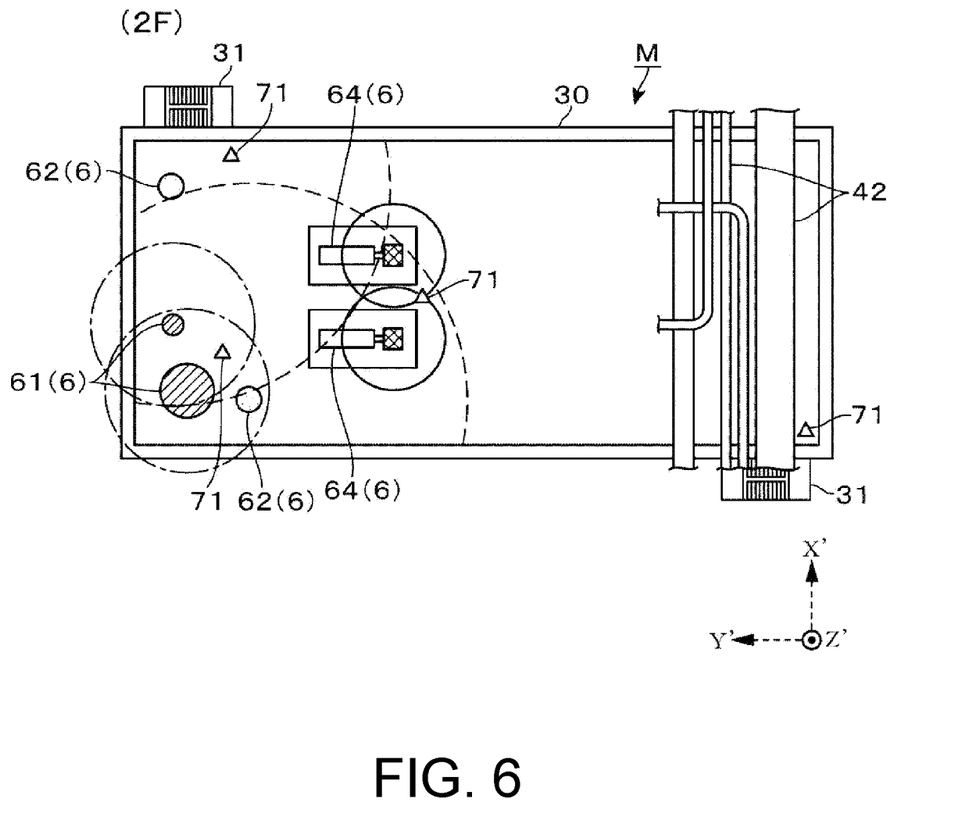
FIG. 6 is a second explanatory diagram for illustrating an example of arranging fire extinguishers in the module.
Figure 7:
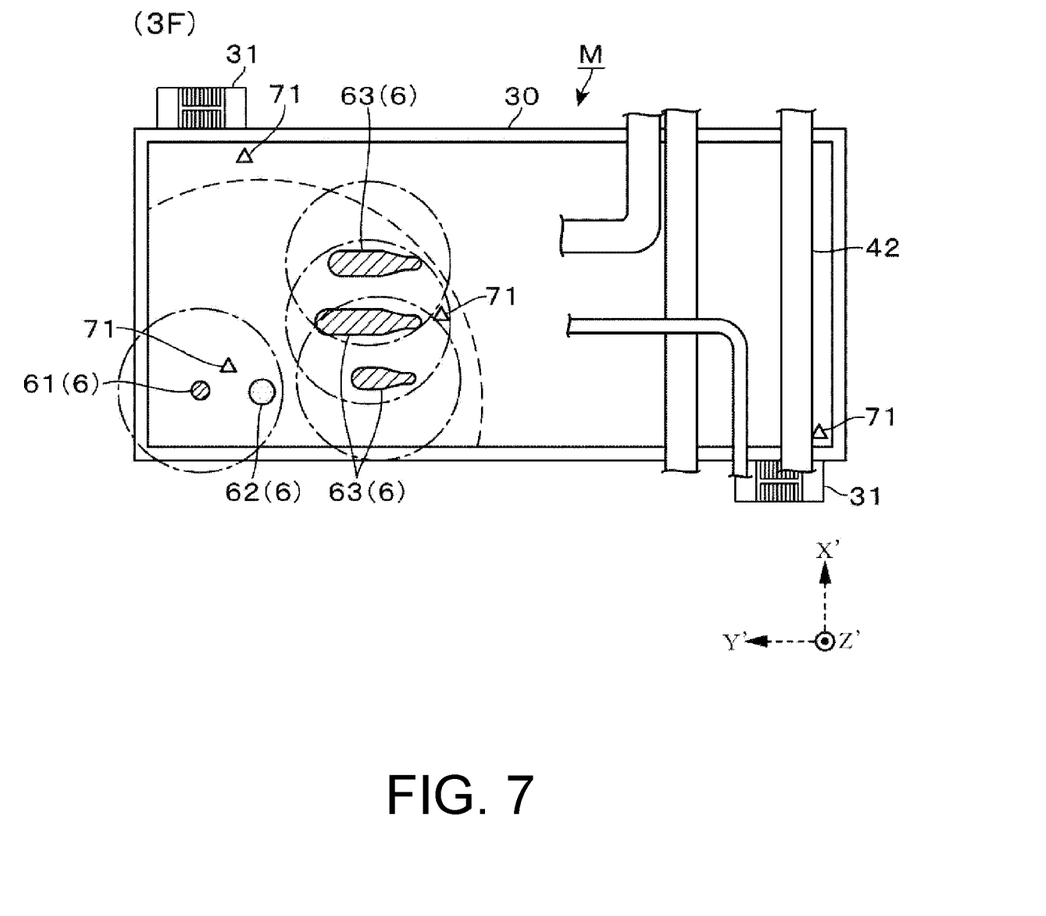
FIG. 7 is a third explanatory diagram for illustrating an example of arranging fire extinguishers in the module.
Figure 8:
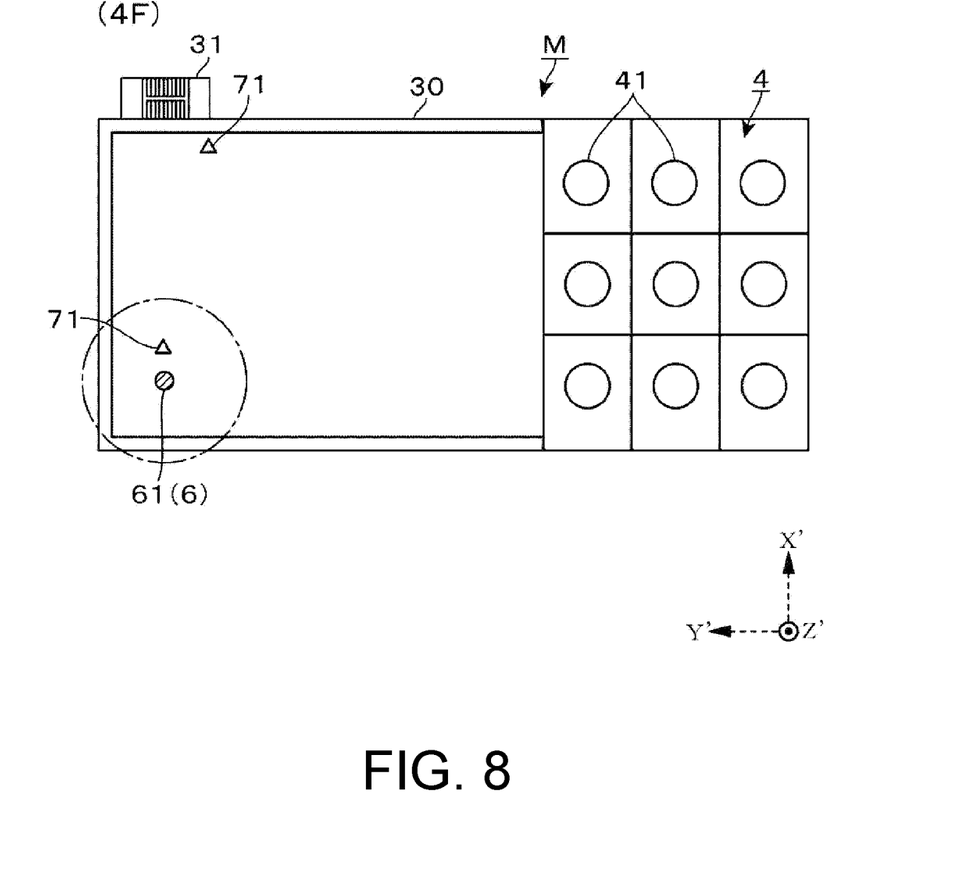
FIG. 8 is a fourth explanatory diagram for illustrating an example of arranging fire extinguishers in the module.

As illustrated in FIG. 6 to FIG. 8, stairs 31 connecting the floors are provided to the module M. Further, when the module M is constructed at a place different from the construction site, the module M is arranged on a foundation provided on the ground. In this case, a first floor portion of the module M is arranged at a position higher than the ground, and hence, as illustrated in FIG. 2 and FIG. 5, stairs 31 connecting the outside of the module M in this example and the first floor portion are provided. For convenience of illustration, in FIG. 2, only stairs 31 to the first floor portion are illustrated, and arrangement positions thereof are also illustrated at positions that are different from actual arrangement positions illustrated in FIG. 5.

On the upper surface of the structure 30, a row in which a plurality of ACHEs 41 are arrayed is provided along the Y' axis direction heading from the trailing end side to the leading end side. Further, a plurality of rows of ACHEs 41 (for convenience of illustration, an example of three rows is shown in FIG. 1) are provided in a width direction of the structure 30 to arrange a large number of ACHE groups 4. As described above, those ACHEs 41 form a part of the devices 6 arranged in the module M.

As illustrated in FIG. 2, a space on the lower side of the region in which the ACHE groups 4 are arranged is a pipe rack in which a large number of pipes 42 through which fluids delivered between the devices 6 or between the modules M flow are arranged. Those pipes 42 also form a part of the devices 6 arranged in the module M.

Also in a module M in which no ACHE group 4 is arranged, a pipe rack is provided in a region on the trailing end side arranged side by side with the region in which the ACHE groups 4 are arranged in other modules M.

Further, in a space on the lower side of the pipe rack, and in a space on the leading end side of the pipe rack, various devices 6 including static devices such as the processing tower 61, the vessel 62, and the heat exchanger 63, which have been described above, dynamic devices such as the pumps 64, and connection pipes (not shown) for connection between the static devices and the dynamic devices, and to the pipes 42 on the pipe rack side are arranged.

In the LNG plant 1 having the configuration described above, in each module M, safety protective equipment to be used in a fire extinguishing operation by an operator, or to be used for safety protection of an operator in a case where a fluid handled in a device 6 leaks may be arranged. Examples of the safety protective equipment include a fire extinguisher, a self-contained breathing apparatus (hereinafter also referred to as "SOBA"), a gas mask, a stretcher, and a fire blanket.

Safety monitoring apparatus for finding and informing the leakage of the fluid and other incidents as soon as possible may also be arranged. Examples of the safety monitoring apparatus include an emergency information apparatus (for example, emergency button or emergency telephone station), and a monitoring camera.

As described above, in the embodiment of the present invention, those safety protective equipment and safety monitoring apparatus are collectively referred to as "equipment".

In the LNG plant 1 in the embodiment of the present invention, in arranging various pieces of equipment in each module M, positions to arrange the equipment are determined based on the following policy.

Specifically, depending on the severity of the risk accompanying flowing of the fluid out of the device 6, a distance from the device 6, which indicates a range in which the equipment for addressing the flowing-out of the fluid is arrangeable, is set short for a device 6 with a higher risk. In contrast, for a device 6 with a lower risk, the distance is set long as compared to the device 6 with the higher risk.

In accordance with the policy, for the device 6 for which the risk accompanying the flowing-out of the fluid is high, the equipment for addressing the flowing-out is arranged closer. In contrast, for the device 6 with the lower risk, as compared to the device 6 with the higher risk, the equipment is allowed to be arranged farther.

In order to determine the positions to arrange the equipment based on the above-mentioned policy, it is required to quantitatively calculate the severity of the risk accompanying the flowing-out of the fluid. Therefore, in this example, as a method of calculating the risk, a risk evaluation method in maintenance methods called "risk-based inspection (RBI)" and "risk-based maintenance (RBM)" is used.

The RBI is a method of determining, for example, selection, ordering, and an inspection period of a device 6 to be inspected of the large number of devices 6 provided in the plant depending on the severity of the risk accompanying a breakage of the device 6. The RBM is a method of developing a maintenance plan including, in addition to the inspection, repair and update of the device 6 based on a similar idea. In the following description, the RBI and the RBM are collectively referred to as "RBM".

In the RBM, the risk accompanying the breakage of the device 6 is defined by the following expression (1):

$$\text{Risk} = (\text{Probability that a breakage occurs}) \times (\text{Impact degree of the breakage}) \qquad (1).$$

The "probability that a breakage occurs" is a probability that a damage of a size that is set in advance occurs in the device 6 within a predetermined period, and the "impact degree of the breakage" is an index for qualitatively or quantitatively evaluating a degree of impact on a loss and health.

Implementing standards of the RBM are defined in, for example, manuals published by industry associations, and the risk accompanying a breakage of each device 6 can be calculated through computing based on the implementing procedures. Examples of the manuals include Recommended Practice (RP) 581 published by American Petroleum Institute (API) and HPIS Z 106 and Z 107 TR published by High Pressure Institute of Japan. Further, software compliant with those implementing standards are also on sale, and the risk of a breakage of the device 6 can be grasped as a part of maintenance operation of each plant.

Meanwhile, from the viewpoint of arranging the equipment, the risk of each device 6 calculated in the expression (1) can also be regarded as a risk of flowing-out of a fluid requiring to be addressed with the use of deployed equipment. Therefore, from the viewpoint focusing on the flowing-out of the fluid, the above-mentioned expression (1) is read as the following expression (1)':

$$\text{Risk} = (\text{Probability that flowing-out of a fluid requiring use of equipment occurs}) \times (\text{Impact degree of the flowing-out of the fluid}) \qquad (1)'.$$

Then, the "probability that flowing-out of a fluid occurs" in the expression (1)' can be calculated with the use of the "probability that a breakage occurs" in the expression (1), and the "impact degree of the flowing-out of the fluid" can be similarly calculated with the use of the "impact degree of the breakage".

It should be noted, however, that for flowing-out of a fluid from a device 6, for example, an impact degree may be different even with flowing-out of the same fluid from the viewpoint of flammability of a fluid requiring fire extinguishment by a fire extinguisher 71 and from the viewpoint of an oxygen concentration and toxicity requiring an operator to use an SOBA 72 or a gas mask. In such case, the impact degree to be evaluated is changed depending on the type of the equipment considered for arrangement. Hitherto, also in the expression (1) calculated in the RBM, a final impact degree of the breakage can be evaluated considering all impact degrees that are different in properties such as a loss (scale of fire and explosion) and health (oxygen deficiency and toxicity). Therefore, an impact degree corresponding to the type of the equipment considered for arrangement may be extracted to perform the calculation of the expression (1)'.

Then, after the severity of the risk accompanying the flowing-out of the fluid is calculated for each device 6 in the module M, a distance indicating a range in which the deployed equipment is arrangeable around each of the devices 6 is determined. At this time, the distance of the range in which the equipment is arrangeable is set so that, when risks calculated for a plurality of devices 6 are compared with each other, the distance is shorter for a device 6 for which the risk is relatively high, and the distance is longer for a device 6 for which the risk is relatively low.

Figure 3:
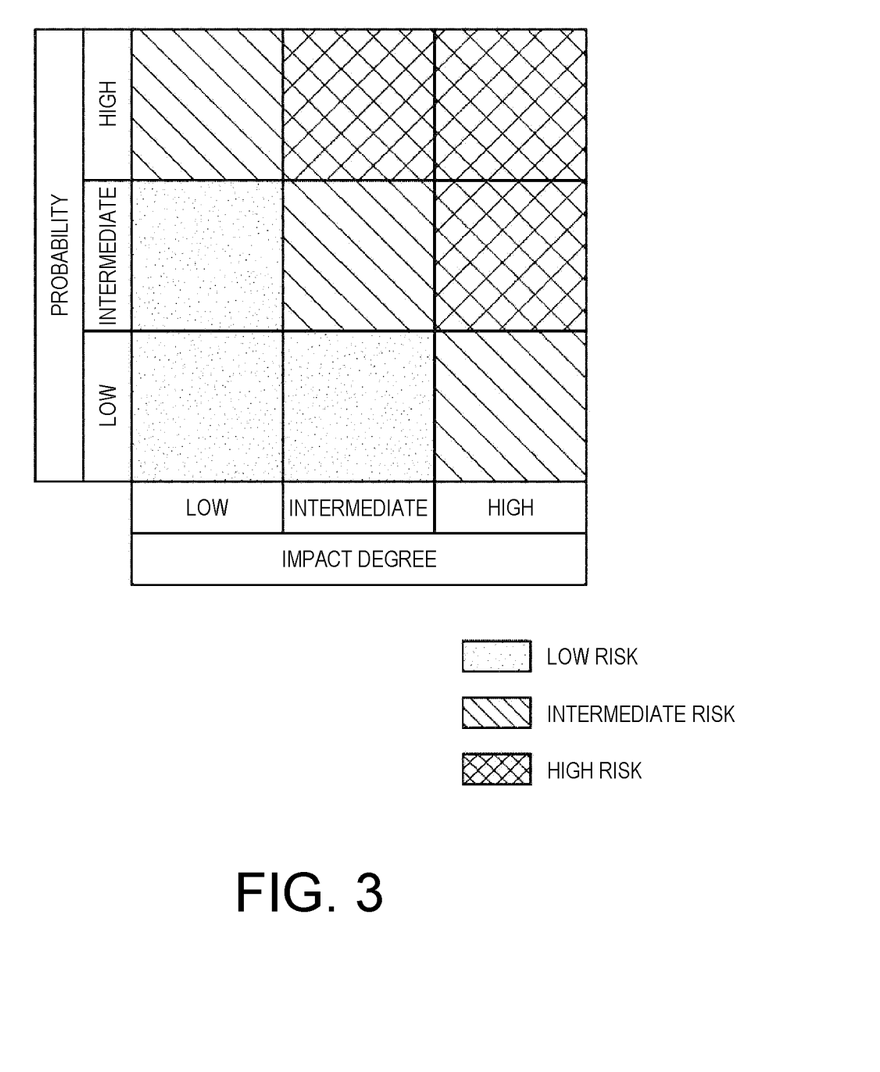
FIG. 3 shows a risk matrix for categorizing a risk accompanying flowing of a fluid out of a device provided in the LNG plant.

In order to set the distance of the range in which the equipment is arrangeable in a simpler manner, the risks calculated with the use of the expression (1)' may be categorized into classes that have been set in advance depending on levels of the risks. FIG. 3 shows a risk matrix, which is an example of the categorizing. Rows in the matrix indicate levels of the "probability that flowing-out of a fluid occurs" in the right side of the expression (1)', and columns indicate levels of the "impact degree of the flowing-out of the fluid" of the expression (1)'. Further, through setting ranges of values of the probability and the impact degree corresponding to classes "high, intermediate, and low" of the rows and the columns in advance, the class of the risk: "high risk, intermediate risk, or low risk" can be identified in a simple manner.

In this case, the distance of the range in which the equipment is arrangeable is set so that the distance is shorter for a device 6 categorized into a class of relatively high risk, and the distance is longer for a device 6 categorized into a class of relatively low risk.

In examples illustrated in FIG. 5 to FIG. 9 to be described later, distances are set by the above-mentioned method. In those examples, around the devices 6, a fire extinguisher 71 is arranged within a range of 3 m for a device 6 with high risk, and fire extinguishers 71 are arranged within ranges of 10 m and 25 m for devices 6 with intermediate risk and low risk, respectively. Meanwhile, in arranging the SOBA 72, the SOBA 72 are installed within ranges of 8 m, 20 m, and 40 m in order of high risk, intermediate risk, and low risk, respectively.

Figure 4:
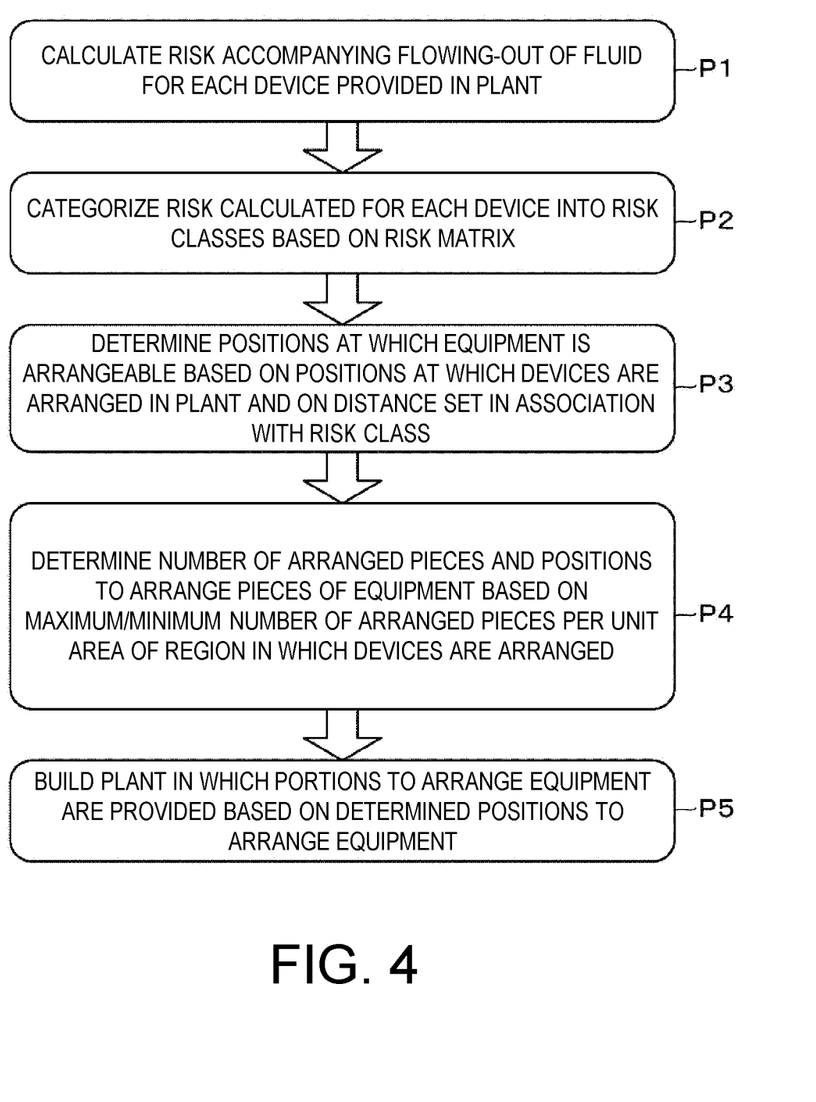
FIG. 4 is an explanatory chart for illustrating implementing procedures of a method of arranging equipment in a plant in general.

A description is given of an example of arranging the equipment in the plant based on the method described above. FIG. 4 shows implementing procedures of arranging the equipment in a plant in general (without limiting to the LNG plant 1) based on the method described above. Further, FIG. 5 to FIG. 9 show examples in which the method is applied to a module M in the LNG plant 1 described with reference to FIG. 1 and FIG. 2.

Figure 9:
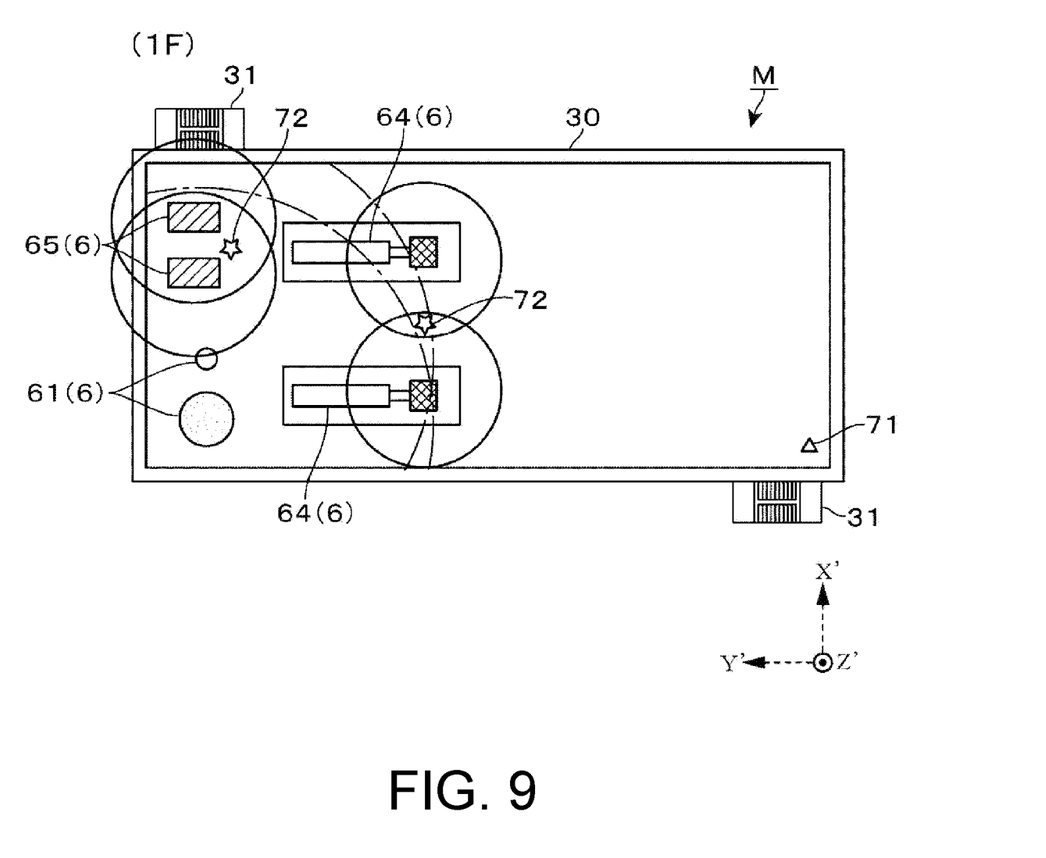
FIG. 9 is an explanatory diagram for illustrating an example of arranging self-contained breathing apparatus in the module.

Now, consideration is given to a case in which one module M to be arranged in the LNG plant 1 is selected, and in which equipment selected from an equipment group consisting of a fire extinguisher, an SOBA, a gas mask, a stretcher, a fire blanket, an emergency information apparatus, and a monitoring camera is arranged in the module M. FIG. 5 to FIG. 8 show arrangement examples of fire extinguishers 71 on the first to fourth floors of the module M. In FIG. 5 to FIG. 8, the fire extinguishers 71 are indicated by open rectangles "A". Further, FIG. 9 shows an example of arranging the SOBA 72 on the first floor of the module M. In FIG. 9, the SOBA 72 are indicated by open stars "*".

First, for the devices 6 provided in the selected module M, the risks accompanying the flowing-out of the fluid is calculated based on the expression (1)' (Procedure P1 of FIG. 4). As described above, the risk may be calculated with the use of a computer using RBM software.

While a plurality of devices 6 are provided in the module M, it is not required to calculate the risks for all the devices 6. The risks may be calculated after selecting in advance devices 6 with large impact degrees on the risks, such as selecting devices 6 with amounts of fluids held in the devices 6 that are larger than a preset threshold value. From viewpoints of convenience of illustration, the pipes 42 of FIG. 6 and FIG. 7, and the ACHEs 41 of FIG. 8 are excluded from devices 6 for which the arrangement positions of the equipment are considered.

Next, the risks calculated for the devices 6 based on the risk matrix described with reference to FIG. 3 are categorized into risk classes of "high risk, intermediate risk, and low risk", for example (Procedure P2 of FIG. 4). In FIG. 5 to FIG. 9, devices 6 with high risk are shaded with cross lines, devices 6 with intermediate risk are shaded with oblique lines, and devices 6 with low risk are shaded with dots.

Thereafter, a position at which the equipment is arrangeable is determined based on the positions at which the devices 6 are arranged in the plant, and on the distance of the range in which the equipment is arrangeable, which is set in association with the risk class (Procedure P3 of FIG. 4). In FIG. 5 to FIG. 9, the range in which the equipment is arrangeable around each device 6 is indicated by a circle. The circles of ranges in which the equipment is arrangeable are indicated by the solid line for a device 6 with high risk, by the one-dot chain line for a device with intermediate risk, and by the broken line for a device with low risk.

In each circle shown in FIG. 5 to FIG. 9, one piece of equipment (fire extinguisher 71 in FIG. 5 to FIG. 8, and SCBA 72 in FIG. 9) is arrangeable. Meanwhile, when one piece of equipment is arranged in each circle even though a plurality of circles overlap with each other, more than required pieces of equipment may be arranged in a limited region.

Further, outside the circles, no equipment may be arranged nearby.

To address this problem, the number of arranged pieces and positions to arrange the pieces of equipment may be determined based on the maximum/minimum number of arranged pieces per unit area in the region in which the devices 6 are arranged (Procedure P4 of FIG. 4).

The maximum number of arranged pieces per unit area is set in advance, and in the region in which the number of arranged pieces of equipment exceeds the maximum number of arranged pieces, the equipment is arranged so as to satisfy the maximum number of arranged pieces. As a specific method, an example may be given of a case of arranging, in a region in which a plurality of circles overlap with each other, equipment common to a plurality of devices 6 corresponding to those circles (FIG. 5 to FIG. 7).

Further, the minimum number of arranged pieces per unit area is also set in advance, and in a region in which the number of arranged pieces is less than the minimum number of arranged pieces, the equipment is arranged so as to satisfy the minimum number of arranged pieces. For example, on the third and fourth floors of the module M shown in FIG. 7 and FIG. 8, a fire extinguisher 71 is additionally arranged near stairs 31, which are outside the circles, and around which no fire extinguisher 71 is arranged.

A method of arranging, while omitting the adjustment of the number of arranged pieces based on the above-mentioned maximum/minimum number of arranged pieces (Procedure P4), one piece of equipment in each range in which the equipment is arrangeable that is determined in Procedure P3 is not to be excluded.

Through thus determining the number of arranged pieces and the positions to arrange the pieces of equipment in accordance with Procedures P1 to P4, the equipment can be arranged depending on the severity of the risk accompanying the flowing-out of the fluid. Particularly on the first to third floors of the module M shown in FIG. 5 to FIG. 7, different numbers of fire extinguishers 71 are arranged despite that floor areas are substantially equal to each other.

When fire extinguishers 71 are arranged at preset intervals as in the related art, the same number of fire extinguishers 71 are arranged on every floor. In comparison, in the method according to the present invention, the equipment can be arranged rationally at required places while suppressing excessive arrangement at unnecessary places.

Further, as described above, through setting different impact degrees of the expression (1)' depending on the type of the equipment to be arranged, the risk in the case in which a fluid flows out of the device 6 can be changed depending on the type of the equipment.

For example, when focusing attention on a chemical tank 65 illustrated in FIG. 5 and FIG. 9, the device 6 has a "low risk" from the view point of using a fire extinguisher 71, while the device 6 has a "high risk" from the viewpoint of using the SOBA 72 so that the risk classes can be changed depending on the type of the equipment. Through performing such risk evaluation, the positions to arrange fire extinguishers 71 and SOBA 72 and the number of arranged fire extinguishers 71 and SOBA 72 in the common arrangement area are changed, and hence appropriate arrangement depending on the type of the equipment can be achieved.

In addition to the fire extinguishers 71 and the SOBA 72, equipment of other types to be provided in the module M is considered in accordance with Procedures P1 to P4 of FIG. 4 to determine the number of arranged pieces and positions to arrange the pieces. Then, similar consideration is given to other modules M provided in the LNG plant 1. Further, similar consideration is given to a region in which devices 6 are provided outside the module M. Through the procedures described above, the number of arranged pieces and the positions to arrange the pieces of equipment to be provided in the LNG plant 1 can be determined.

When the number of arranged pieces and the positions to arrange the pieces of equipment in the plant are determined, the plant in which portions to arrange the equipment are provided is built based on a result of the consideration (Procedure P5 of FIG. 4).

For equipment such as a fire extinguisher 71, a SOBA 72, and a gas mask to be carried out for use by an operator, storages and installation bases for the equipment correspond to the portions to arrange the equipment. A sign indicating the place at which the equipment is arranged, for example, may also be provided. In contrast, for equipment such as an emergency information apparatus and a monitoring camera to be fixedly mounted, positions at which those pieces of equipment are actually mounted correspond to the portions to arrange the equipment.

In the case of the LNG plant 1 formed of the modules M, the portions to arrange the equipment may be provided at a place of construction of the modules M. After required devices 6 and the portions to arrange the equipment are provided to complete the module M, the module M is transported to the construction site. Thereafter, each module M is mounted on the foundation, and the pipes 42 between the modules M are connected to each other. In addition, devices 6 provided outside the module M are mounted, the pipes 42 are connected to each other, and the portions to arrange the equipment are mounted, for example, to complete the LNG plant 1.

According to the method of arranging the equipment of the embodiment of the present invention, the following effects are obtained. The severity of the risk accompanying the flowing of a fluid out of each device 6 provided in the plant is determined, and the distance of the range in which the equipment is arrangeable from the device 6 is adjusted depending on the severity of the risk, and hence the equipment can be rationally arranged in the plant.

Here, the method of setting the distance of the range in which the equipment is arrangeable from the device 6 is not limited to the method involving categorizing the risk with the use of the risk matrix illustrated in FIG. 3. For example, there may be adopted a method of directly calculating the distance with the use of, for example, a computational expression in which the value of the risk calculated with the expression (1)' is multiplied by a proportionality factor.

Further, in the example described with reference to FIG. 1, FIG. 2, and FIG. 5 to FIG. 9, the method of arranging the equipment in the example of the present invention is applied to the LNG plant 1 formed by providing a large number of devices 6 in the structure 30 to build the module M, and combining a plurality of the modules M. Meanwhile, the LNG plant 1 to which the method of arranging the equipment is applicable is not limited to that formed of the modules M. For example, the method of the present invention is also applicable to an LNG plant 1 built by a method called "stick-build", in which the structure 30 is built at the construction site, and devices 6 are arranged on the structure 30 and the ground.

Still further, the plant to which the method of arranging the equipment in the example of the present invention is applicable is not limited to the LNG plant 1. For example, the method of the present invention is also applicable to various plants including a natural gas plant for separating and recovering natural gas liquid, an oil refinery plant for distilling and desulfurizing crude oil and various intermediate products, a chemical plant for producing petrochemicals, intermediate chemicals, and polymers, a pharmaceutical plant for producing pharmaceuticals and intermediate products thereof, and a waste treatment plant for treating low-level radioactive wastes.

Those various plants may be built by the module M method or the stick-build method. Further, devices 6 forming the plant are not limited to be arranged outdoors, and various devices 6 may be arranged in a building.

Further, the method of arranging the equipment according to the present invention can be applied not only to the case of building the plant, but also to revising the positions to arrange when various pieces of equipment in an existing plant are to be updated.

REFERENCE SIGNS LIST

M module
1 LNG plant
6 device
71 fire extinguisher
72 SOBA

The invention claimed is:

1. A method of arranging equipment in a plant, the equipment being safety protective equipment to be used in fire extinguishing operation by an operator, or to be used for safety protection of an operator in the plant for processing a fluid, the method comprising the steps of:
   calculating, by a computer, a risk for each of a plurality of devices provided in the plant, the risk being a value obtained by multiplying a probability that flowing-out of the fluid requiring use of the equipment occurs by an impact degree;
   setting, by the computer, a distance indicating a range in which the equipment is arrangeable around each of the plurality of devices so that, in response to the calculated risks of the plurality of devices being compared with each other, the distance is shorter for a device for which the risk is relatively high, and the distance is longer for a device for which the risk is relatively low;
   determining, by the computer, a position to arrange the equipment based on positions at which the plurality of devices are arranged in the plant, and on the distance of the range in which the equipment is arrangeable, which has been set for each of the plurality of devices;
   setting, by the computer, a minimum number of arranged pieces of the equipment per unit area in a region in which the plurality of devices are arranged in the plant, to arrange the equipment so as to satisfy the minimum number of arranged pieces in a region in which the plurality of devices are arranged, and for which the number of pieces of the equipment per unit area arranged at positions that have been determined in the step of determining the position to arrange the equipment is less than the minimum number of arranged pieces; and
   building the plant in which portions to arrange the equipment are provided based on the determined positions to arrange the equipment.

2. The method of arranging equipment in the plant according to claim 1, wherein the equipment is one selected from an equipment group consisting of a fire extinguisher, a self-contained breathing apparatus, a gas mask, a stretcher, a fire blanket, an emergency information apparatus, and a monitoring camera.

3. The method of arranging equipment in the plant according to claim 1, wherein the step of setting, by the computer, the distance of the range in which the equipment is arrangeable includes categorizing the risks calculated for the plurality of devices into classes that have been set in advance depending on levels of the risks to set the distance so that the distance is shorter for a device categorized into a class of relatively high risk, and the distance is longer for a device categorized into a class of relatively low risk.

4. The method of arranging equipment in the plant according to claim 1, further comprising setting, by the computer, a maximum number of pieces of the equipment per unit area in a region in which the plurality of devices are arranged in the plant, to arrange the equipment so as to satisfy the maximum number of pieces in the region in which the plurality of devices are arranged, and for which the number of pieces of the equipment per unit area arranged at positions that have been determined in the step of determining the position to arrange the equipment exceeds the maximum number of pieces.

5. A method of manufacturing a plant for processing a fluid, comprising a step of arranging, at the position to arrange the equipment that has been determined in the step of determining the position to arrange the equipment in the plant of claim 1, a portion of the plant to arrange the equipment.

* * * * *